United States Patent
Kümmel et al.

(10) Patent No.: US 10,015,103 B2
(45) Date of Patent: Jul. 3, 2018

(54) INTERACTIVITY DRIVEN ERROR CORRECTION FOR AUDIO COMMUNICATION IN LOSSY PACKET-SWITCHED NETWORKS

(71) Applicant: GetGo, Inc., Boston, MA (US)

(72) Inventors: Sascha Kümmel, Dresden (DE); Mathias Buhr, Freiberg (DE)

(73) Assignee: GetGo, Inc., Boston, MA (US)

( * ) Notice: Subject to any disclaimer, the term of this patent is extended or adjusted under 35 U.S.C. 154(b) by 196 days.

(21) Appl. No.: 15/152,793

(22) Filed: May 12, 2016

(65) Prior Publication Data

US 2017/0331756 A1    Nov. 16, 2017

(51) Int. Cl.
    *H04L 12/863*    (2013.01)
    *H04L 12/26*    (2006.01)
    *H04L 12/24*    (2006.01)

(52) U.S. Cl.
    CPC .......... *H04L 47/54* (2013.01); *H04L 41/0816* (2013.01); *H04L 43/0835* (2013.01)

(58) Field of Classification Search
CPC .. H04L 47/54; H04L 41/0816; H04L 43/0835
See application file for complete search history.

(56) References Cited

U.S. PATENT DOCUMENTS

| | | | | |
|---|---|---|---|---|
| 5,964,877 A * | 10/1999 | Victor | ...................... | G06F 21/35 340/5.54 |
| 6,538,989 B1 * | 3/2003 | Carter | ................... | H04L 47/521 370/229 |
| 7,627,467 B2 | 12/2009 | Florencio et al. | | |
| 7,668,712 B2 | 2/2010 | Wang et al. | | |
| 7,793,193 B2 | 9/2010 | Koch et al. | | |
| 8,189,492 B2 | 5/2012 | Qiu et al. | | |
| 8,473,833 B2 | 6/2013 | Melliar-Smith et al. | | |
| 8,731,908 B2 | 5/2014 | Kapilow | | |
| 9,041,766 B1 * | 5/2015 | Gates | ....................... | H04N 7/15 348/14.08 |
| 9,608,889 B1 * | 3/2017 | Lundin | ............... | H04L 43/0829 |
| 2007/0177502 A1 * | 8/2007 | Hama | ..................... | H04L 47/10 370/229 |
| 2008/0095198 A1 * | 4/2008 | Wager | ..................... | H04L 47/10 370/519 |
| 2015/0012270 A1 * | 1/2015 | Reynolds | ................ | G10L 25/84 704/233 |
| 2015/0332732 A1 * | 11/2015 | Gilson | ................. | G11B 27/036 386/240 |

* cited by examiner

*Primary Examiner* — Christine Ng
(74) *Attorney, Agent, or Firm* — BainwoodHuang (57) ABSTRACT

When packet loss is detected during a communication session, a current interactivity mode is checked to determine whether to increase the amount of received audio data stored in a buffer of the receiving device. If the current interactivity mode indicates a low level of interactivity between participants in the communication session, then the total amount of received audio data stored in the buffer is increased, in order to increase the delay between receipt of audio data by the electronic device, and outputting of the audio data by the electronic device. The increased output delay is then used to recover lost packets, so that audio quality is increased while the level of interactivity between participants is low. When the current interactivity mode subsequently indicates higher participant interactivity, the amount of received audio data stored in the buffer may be reduced.

21 Claims, 4 Drawing Sheets

INTERACTIVITY DRIVEN ERROR CORRECTION FOR AUDIO COMMUNICATION IN LOSSY PACKET-SWITCHED NETWORKS

BACKGROUND

As it is generally known, packet loss occurs when one or more packets of data travelling across a computer network fail to reach their destination. Various network conditions may cause packet loss, including network congestion.

Packet loss is sometimes addressed by retransmission of lost data. For example, the Transmission Control Protocol (TCP) uses retransmission to guarantee correct delivery of data even when packets are lost in transit.

Another approach to handling packet loss is to transmit data redundantly, so that the receiving device can reconstruct the lost data without requesting retransmission. Redundant data transmission techniques are generally referred to as forward error correction (FEC). FEC enables correction of some errors at a receiver without retransmission of data, but requires a higher channel bandwidth for data transmission. Examples of FEC include techniques that apply Reed-Solomon codes, Hamming codes, Golay codes, Reed-Muller codes, Turbo codes, and Low Density Parity Check (LDPC) codes.

Failure to address packet loss during network-based audio data communications may result in reduced quality of the audio output by receiving devices that experience the packet loss. However, existing techniques for handling packet loss, such as packet retransmission and/or FEC, introduce delays that may reduce the ability of users, such as participants in an online meeting, to hold real-time conversations over the network. In this way, some techniques for addressing network packet loss may reduce the "conversational quality" of audio communications being provided over a network.

SUMMARY

Unfortunately, previous network-based audio communication systems have addressed packet loss in ways that statically provide either good audio quality, or good conversational quality, for entire communication sessions, without adapting to actual communication conditions experienced during the sessions. For example, some previous systems have statically provided good audio quality by using reliable underlying communication protocols that guarantee packet delivery through data retransmission (e.g. TCP). While statically applying protocols using data retransmission can be effective to address packet loss, a large amount delay may be introduced into the playback of the audio on receiving devices throughout the entire communication session, making it impractical to hold real-time conversations between multiple users.

In interactive audio communications, as is provided during online meetings, providing good conversational quality requires that the delay between when audio data is transmitted from a sending device and when it is played back by a receiving device be kept small, so that meeting participants can interact in real-time during the meeting. Accordingly, to avoid delays resulting from protocols that use packet retransmission to guarantee packet delivery, some other previous audio communication systems have instead used "unreliable" underlying communication protocols, which do not employ retransmission of lost packets to guarantee packet delivery, and therefore exhibit less delay. One example of such unreliable protocols is the Real-time Transport Protocol (RTP). In order to present gapless and continuous audio, receiving devices using such protocols have often had to handle lost packets by reducing audio quality, e.g. by inserting silence into the output audio, thus potentially compromising audio quality during the entire communication session.

To address the above described and other shortcomings of previous systems, a new system for providing voice communications over a lossy, packet-switched communication network is disclosed in which handling of lost packets includes dynamically adapting to varying communication conditions experienced during a communication session, based on a current interactivity mode. In the disclosed system, digitized audio data received by an electronic device from a remote device during a communication session is stored into a buffer located within the electronic device, before the audio data is provided from the buffer to output logic of the electronic device.

During the communication session, the disclosed system detects and stores a current interactivity mode. The current interactivity mode may be a) non-interactive, indicating a low level of interactivity between participants in the communication session, or b) interactive, indicating a high level of interactivity between participants in the communication session. In response to detecting that one or more packets of audio data transmitted from a remote device to the electronic device were lost prior to being delivered to the electronic device, the stored current interactivity mode is checked.

In response to detecting that at least one packet of audio data transmitted to the electronic device from the remote device has been lost prior to being delivered to the electronic device at a point in time during the communication session when the current interactivity mode is non-interactive, the total amount of received audio data that is concurrently stored in the buffer within the electronic device may be increased. By increasing the amount of audio data stored in the buffer, a longer delay is created between when audio data is received by the electronic device, and when the received audio data is output by the electronic device. This increased delay in outputting the received audio data from the electronic device is used to mask the time required to recover lost packets, e.g. by a) requesting packet retransmission and/or b) re-creating the lost data on the electronic device using redundant data provided in the transmitted data, e.g. based on forward error correction techniques. The increase in delay caused by increasing the amount of buffered audio data is acceptable during non-interactive mode, since communication participants are primarily listening, and not interacting with each other. Non-interactive mode may, for example, occur during a portion of the communication session during which only a single participant is speaking, and the other participants are only listening. Recovery of lost packets during the increased delay improves the audio quality provided during such portions of the communication session. When the interactivity mode subsequently changes to interactive mode, e.g. during portions of the communication session when more than one participant is speaking, the amount of audio data stored in the buffer may be automatically reduced, in order to decrease the delay in outputting the received audio data from the electronic device, thus improving the conversational quality of the communication session in order to better support the increased level of participant interaction.

In another aspect of the disclosed system, a round trip time between the electronic device and the remote device may be determined, e.g. using conventional techniques such as the ping computer network software utility or the like.

The total amount of received audio data concurrently stored in the buffer may be increased to equal a time interval of audio data having a duration that is greater than the round trip time between the electronic device and the remote device from which packet loss was detected. This amount of increased buffering provides a sufficient delay between receipt and playback of audio data to allow for the electronic device to request and receive retransmissions of lost packets from the remote device.

The total amount of received audio data concurrently stored in the buffer may be increased by time stretching the audio data stored in the buffer by decreasing a play-out speed at which the audio data is output from the buffer to the output logic to a rate that is slower than an input rate at which audio data is received and added to the buffer, until the total amount of received audio data concurrently stored in the buffer is equal to the time interval of audio data having a duration that is greater than the round trip time between the electronic device and the remote device.

The electronic device may be embodied as a participant device used by a participant in the communication session to participate in the communication session, such as an online meeting. In such an embodiment, detecting the current interactivity mode may include determining whether an audio input of the electronic device, such as a microphone or the like, is currently muted. In response to determining that the audio input device is currently muted, the disclosed system may determine that the current interactivity mode is non-interactive.

In another aspect of the disclosed system, when the electronic device is embodied as a participant device, detecting the current interactivity mode may include a) monitoring the audio input device of the electronic device during the communication session for the presence of speech received through the audio input device, and b) determining that the current interactivity mode is non-interactive in response to detecting that no speech has been received through the audio input device of the electronic device during the communication session.

Further in response to detecting that at least one packet of audio data transmitted to the electronic device from the remote device has been lost prior to being delivered to the electronic device at a point in time during the communication session when the current interactivity mode is non-interactive, the electronic device may indicate to the remote device to begin transmitting redundant data to enable error correction by the electronic device, e.g. based on forward error correction techniques.

When the electronic device is embodied as a participant device, the output logic in the electronic device may include software and/or hardware logic operable to playback the audio data output from the buffer through at least one speaker of the participant device.

When the electronic device is embodied as a central server system that hosts the communication session, the output logic in the electronic device may include software and/or hardware operable to transmit the audio data output from the buffer to at least one participant device.

The electronic device may also detect that the current interactivity mode has changed from non-interactive to interactive. In response to detecting that the current interactivity mode has changed from non-interactive to interactive, the electronic device may automatically reduce the total amount of received audio data concurrently stored in the buffer contained within the audio device.

When the electronic device is embodied as a participant device, detecting that the current interactivity mode has changed from non-interactive to interactive may be accomplished by detecting that an audio input of the electronic device has transitioned from muted to un-muted.

In another example, when the electronic device is embodied as a participant device, detecting that the current interactivity mode has changed from non-interactive to interactive may be accomplished by detecting speech received by an audio input device of the electronic device.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example and to illustrate various features and principles of the invention, and that the invention itself is broader than the specific examples of embodiments disclosed herein.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
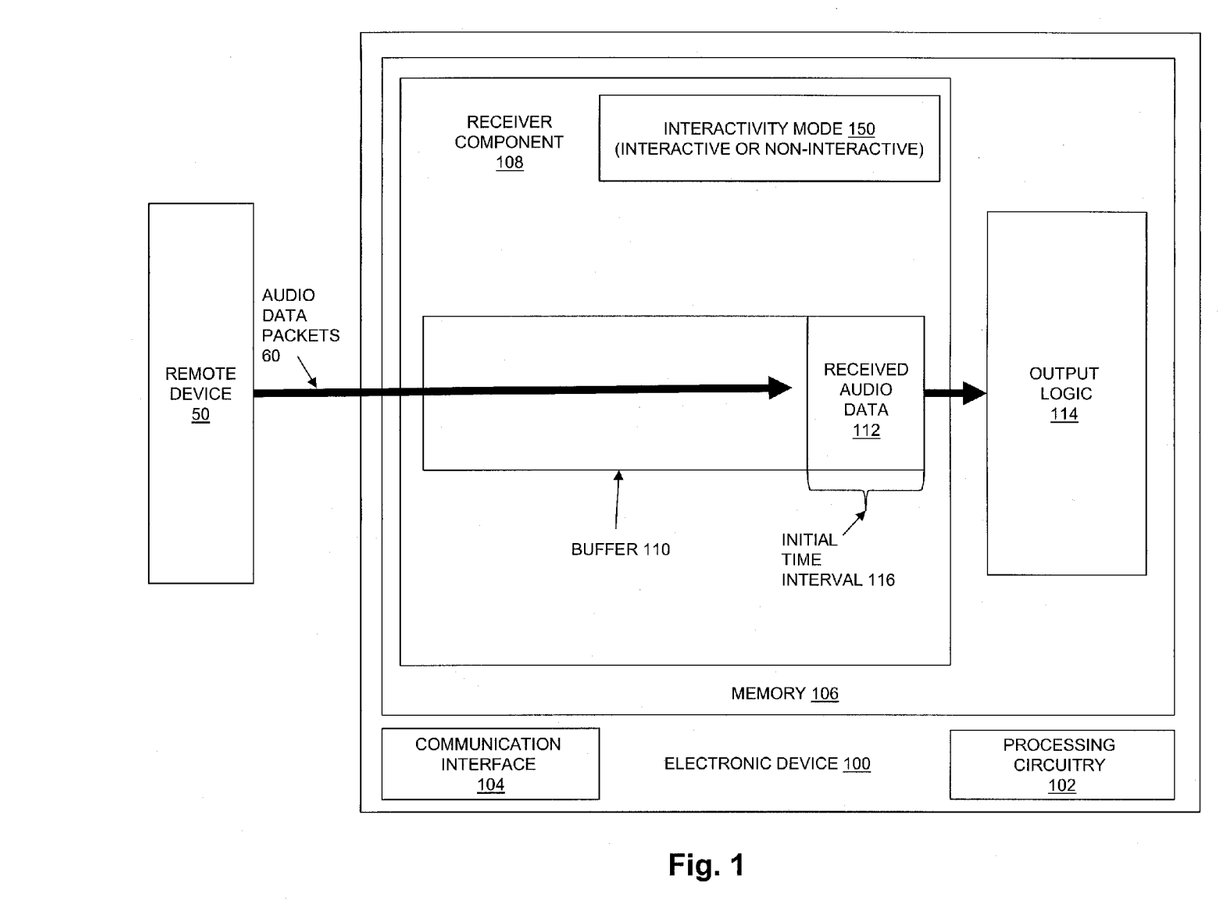
FIG. 1 is a block diagram showing an example of components in an illustrative embodiment while providing a communication session over a communication network.

FIG. 1 is a block diagram showing an example of components in an illustrative embodiment while providing a communication session such as an online meeting over a communication network. In the example of FIG. 1, an Electronic Device 100 is shown including Processing Circuitry 102, Communication Interface 104, and Memory 106. Processing Circuitry 102 may, for example, include or consist of one or more microprocessors or the like. Communication Interface 104 may, for example, include or consist of one or more network interface cards (NICs) or the like. Memory 106 may include or consist of any specific type of volatile or non-volatile semiconductor memory or the like that is operable to store programs (e.g. sequences of instructions) for execution by Processing Circuitry 102, and/or data (e.g. program state information, input data, output data, etc.) for use by the programs executing in the Electronic Device 100.

Electronic Device 100 may consist of or include any specific type of computer or computerized device. For example, Electronic Device 100 may be embodied as a participant device, such as a desktop, laptop computer or tablet computer, or a smartphone or other mobile computing device, that is operable to enable a participant user to participate in a communication session, such as an online meeting, over one or more computer and/or communication networks. Alternatively, Electronic Device 100 may be embodied as a central server computer or system, referred to herein as a bridge device, that is operable to provide an online meeting to multiple meeting participants, through their respective participant devices, over one or more computer and/or communication networks.

The Memory 106 of Electronic Device 100 stores program code for execution by the Processing Circuitry 102, including Receiver Component 108, and Output Logic 114. As further described below, Receiver Component 108 operates to process Audio Packets 60 received by Electronic Device 100 from Remote Device 50. Program code stored in Memory 106 for execution by Processing Circuitry 102 further includes Output Logic 114, which operates to process and output audio data received from Receiver Component 108. The structure of Output Logic 114, and the operation of Output Logic 114 to process and output audio data received from Receiver Component 108, depends on whether Electronic Device 100 is embodied as a participant device or a bridge device. When Electronic Device 100 is embodied as a participant device, Output Logic 114 processes audio data received from Receiver Component 108 for output through an audio output device, such as one or more speakers, headphones, etc., located in or communicably connected to Electronic Device 100. When Electronic Device 100 is embodied as a bridge device, Output Logic 114 may include a mixer component for combining audio data received from multiple participant devices, and processes audio data received from Receiver Component 108 for output in data packets that are transmitted from the bridge device to multiple participant devices through which participant users participate in the online meeting.

In addition, those skilled in the art will further recognize that while for purposes of concise illustration and explanation only certain examples of program code are shown in FIG. 1, other specific program code or logic may also be present in Memory 106. Such additional software may, for example, include a sender component operable to send audio packets to one or more other electronic devices during the communication session, as well as operating system, middleware, and/or various other specific types of application program code.

Remote Device 50 may be a participant device or a bridge device. Electronic Device 100 may be communicably interconnected to Remote Device 50 by one or more communication networks and/or computer networks that allow computers to exchange data. Such networks may, for example, include or consist of one or more Local Area Networks (LANs), Wireless Local Area Networks (WLANs), Wide Area Networks (WANs), e.g. the Internet, and/or any other specific type of network. Messages communicated between Electronic Device 100 and Remote Device 50, such as Audio Data Packets 60 that are transmitted from Remote Device 50 to Electronic Device 100, may be embodied and exchanged based on one or more communication protocols including, but not limited to, Real-time Transport Protocol (RTP), Internet Protocol (IP), User Datagram Protocol (UDP), Ethernet, Wi-Fi, and/or any other specific communication protocol or service that may be appropriate for a particular network or embodiment.

During operation of the components shown in FIG. 1, during a communication session such as an online meeting, Electronic Device 100 receives digitized audio from Remote Device 50 as digital audio data contained in Audio Data Packets 60. For example, an audio signal received from an audio input device, such as a microphone on Remote Device 50, may be sampled, and the digital samples organized into audio frames that are split up into RTP packets and transmitted to Electronic Device 100, as shown by Audio Data Packets 60. The digital audio data in each packet in Audio Data Packets 60 contains a set of encoded digital samples that represents a time interval of the original audio signal. For example, each packet in Audio Data Packets 60 may contain encoded digital audio samples representing approximately 20 milliseconds of the original audio signal. The audio data received in Audio Data Packets 60 may be compressed or uncompressed, and may be encoded or formatted based on any specific type of digital audio and/or compression encoding and/or codec (coder-decoder). Examples of possible digital audio encodings and/or codecs that may be used with or in the disclosed system include without limitation Windows Media Audio (WMA), MP3, Advanced Audio Coding (AAC), and Apple Lossless.

As the Audio Data Packets 60 are received by Electronic Device 100, Receiver Component 112 stores digital audio data extracted from Audio Data Packets 60, into Buffer 110, as shown by Received Audio Data 112. After being stored in Buffer 110, Received Audio Data 112 is output from Buffer 110 on a first-in first-out basis to Output Logic 114. In the example of FIG. 1, the total amount of received audio data concurrently stored in Buffer 110 represents a time interval of the original audio signal equal to Initial Time Interval 116. For example, where each packet in Audio Data Packets 60 contains encoded digital audio samples representing 20 milliseconds of the original audio signal, and where Initial Time Interval 116 is equal to 100 milliseconds, then the total amount of received audio data initially stored in Buffer 110 is equal to the audio data from five packets in Audio Data Packets 60.

Buffer 110 is a first-in first-out data buffer, such as a queue or the like. In one embodiment, Buffer 110 may be made up of or include what is generally referred to as a packet delay variation (PDV) or "jitter" buffer. As it is generally known, PDV buffers may have varying fill levels, and are generally designed to be able to handle varying arrival times (PDV, or jitter) of consecutively sent packets. PDV buffers are operable to decouple the speed at which one or more components in a sending device are operating from the speed at which one or more components are operating in a receiving device. PDV buffers are used in many contexts because hardware-defined sampling clocks used with regard to the output from audio input devices (microphones) and with regard to providing audio data to output devices (e.g. audio mixers, speakers) are not perfectly synchronized, e.g. they operate at slightly different sample rates. This type of speed mismatch may result in buffer overflows or underflows on the playout-side of the buffered audio data, even in cases where no packet delay variation occurs. Accordingly, conventional PDV buffers are typically implemented such that the digital audio data that they store (e.g. Received Audio Data 112), can be "time-scaled". An embodiment of the disclosed system in which Buffer 110 is made up of or includes a PDV buffer enables Buffer 110 to have time-scaling functionality that can be used to stretch or compress the audio signal represented by Received Audio Data 112 along the time axis without changing its pitch. PDV buffers have provided such time-scaling functionality in previous systems in order to provide a continuous stream of sampled audio data to a consumer process on the output side of the buffer, in the face of packet delay variation or jitter.

Further during operation of the components shown in FIG. 1, Receiver Component 108 detects a current interactivity mode during a communication session, and stores an indication of the detected current interactivity mode in Interactivity Mode 150. The current interactivity mode may be either a) non-interactive, indicating a low level of interactivity between participants in the communication session, or b) interactive, indicating a high level of interactivity between participants in the communication session.

When Receiver Component 108 detects the current interactivity mode, the value it stores into Interactivity Mode 150 indicating the current interactivity mode may, for example, be made up of a bit flag or the like, having a first value (e.g. "1") indicating that the current interactivity mode is interactive, or a second value (e.g. "0") indicating that the current interactivity mode is non-interactive.

Receiver Component 108 is also operable to detect that at least one packet of audio data transmitted to Electronic Device 100 from Remote Device 50 has been lost prior to being delivered to Electronic Device 100. Receiver Component 108 may detect that one or more packets in Audio Data Packets 60 have been lost based on conventional packet loss detection techniques, for example by checking packet sequence numbers contained in Audio Data Packets 60 to determine whether each packet in a sequence of packets transmitted from Remote Device 50 is received correctly.

Figure 2:
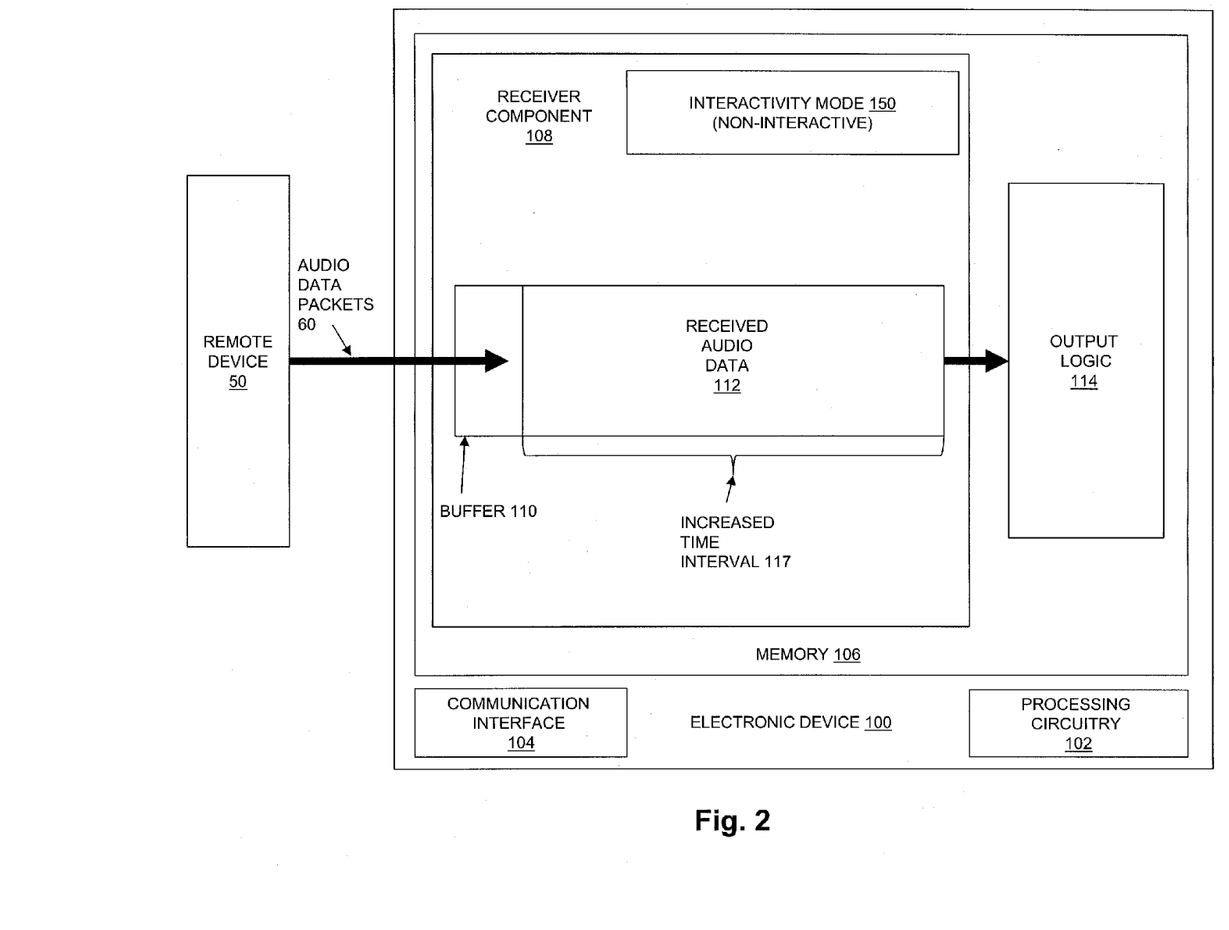
FIG. 2 is a block diagram showing the components in the example of FIG. 1 after the time interval of audio data stored in the receiver component buffer is increased based on detection of packet loss when the interactivity mode is non-interactive.

In response to detecting that at least one packet of audio data transmitted to Electronic Device 100 from Remote Device 50 has been lost prior to being delivered to Electronic Device 100, Receiver Component 108 checks the indication of the current interactivity mode stored in Interactivity Mode 150 in FIG. 1. In response to Interactivity Mode 150 indicating that the current interactivity mode is non-interactive, Receiver Component 108 automatically increases a total amount of received audio data concurrently stored in the buffer of the electronic device. For example, Receiver Component 108 may increase the time interval of received audio data stored in Buffer 110 from a relatively short Initial Time Interval 116 to a longer Increased Time Interval 117, as shown in FIG. 2.

Prior to increasing the total amount of received audio data concurrently stored in the buffer, Receiver Component 108 may check the total amount of received audio data concurrently stored in the buffer, and only increase the total amount of received audio data concurrently stored in the buffer if the time interval of received audio data stored in Buffer 110 is less than Increased Time Interval 117, in order to accommodate situations in which the total amount of audio data concurrently stored in the buffer has previously been increased.

The size of Received Audio Data 112 determines the delay between when received audio data is added to Buffer 110 and when that audio data can be output to the Output Logic 114. Accordingly, by increasing the size of Received Audio Data 112 from Initial Time Interval 116 to Increased Time Interval 117, the disclosed system increases the delay between when audio data is added to Buffer 110 and when that audio data can be output from Buffer 110 to Output Logic 114. For example, if the Initial Time Interval 116 has a duration of 100 milliseconds, then when the time interval of received audio data stored in Buffer 110 is equal to Initial Time Interval 116 the delay between when audio data is added to Buffer 110 and when that audio data can be output to Output Logic 114 is 100 milliseconds. If the Increased Time Interval 117 has a duration of 400 milliseconds, then when the time interval of received audio data stored in Buffer 110 is equal to Increased Time Interval 117 the delay between when audio data is added to Buffer 110 and when that audio data can be output to Output Logic 114 is 400 milliseconds.

The size of Increased Time Interval 117 is based on how much time is required for the Receiver Component 108 to recover a lost packet or packets, and may, for example, be based on a round trip time between Electronic Device 100 and Remote Device 50. For example, Receiver Component 108 may determine a round trip time between Electronic Device 100 and Remote Device, e.g. using conventional techniques such as the ping computer network software utility or the like. When the round trip time between Electronic Device 100 and Remote Device 50 is known, Receiver Component 108 may automatically increase the total amount of received audio data concurrently stored in Buffer 110 to equal an amount of audio data spanning a time interval having a duration that is greater than the round trip time between Electronic Device 100 and Remote Device 50. In other words, Receiver Component 108 may increase the total amount of received audio data concurrently stored in Buffer 110 from Initial Time Interval 116 to an Increased Time Interval 117 that has a duration that is greater than the round trip time between Electronic Device 100 and Remote Device 50. For example, if the round trip time between Electronic Device 100 and Remote Device 50 is 300 milliseconds, then Increased Time Interval 117 may have a duration greater than 300 milliseconds, e.g. 350 milliseconds.

Receiver Component 108 may automatically increase the total amount of received audio data concurrently stored in Buffer 110 by time stretching Received Audio Data 112 as it is played out from Buffer 110 to Output Logic 114. For example, when Buffer 110 is embodied as a PDV buffer that provides time stretching capabilities, Receiver Component 108 may decrease a play-out speed at which Received Audio Data 112 is output from Buffer 110 to Output Logic 114 to a rate that is slower than the rate at which audio data is received and added to Buffer 114. While the play-out speed at which Received Audio Data 112 is output from Buffer 110 to Output Logic 114 is slower than the rate at which audio data is received and added to Buffer 114, the amount of received audio data stored in Buffer 110 will increase, e.g. the size of Received Audio Data 112 in Buffer 110 will grow. Receiver Component 108 may accordingly keep the rate at which Received Audio Data 112 is output from Buffer 110 to Output Logic 114 slower than the rate at which audio data is received and added to Buffer 110 until the amount of received audio data stored in Buffer 110 has increased from Initial Time Interval 116 to Increased Time Interval 117. When the amount of received audio data stored in Buffer 110 has increased to Increased Time Interval 117, Receiver Component 108 may set the rate at which Received Audio Data 112 is output from Buffer 110 to Output Logic 114 back to the rate at which audio data is received and added to Buffer 110.

By increasing the size of Received Audio Data 112 from Initial Time Interval 116 to Increased Time Interval 117, the disclosed system creates a longer delay between when each packet in Audio Data Packets 60 is received by Electronic Device 100, and when the audio data from each packet is output by Electronic Device 100. The increased delay allows Electronic Device 100 to recover a lost packet, e.g. through retransmission or forward error correction techniques, prior to the missing data in the lost packet being needed for output from the Buffer 110, in order to provide a higher level of audio quality while the interactivity mode is non-interactive. For example, when Receiver Component 108 detects that a packet transmitted from Remote Device 50 to Electronic Device 100 has been lost before being delivered to Electronic Device 100, the increased delay allows Receiver Component 108 to recover the lost packet without introducing additional delay. Specifically, when Increased Time Interval 117 is greater than the round trip time between Electronic Device 100 and Remote Device 50, the increased delay is sufficient to cover the time required for a packet retransmission request to be sent from Electronic Device 100 to Remote Device 50, and for the retransmitted packet to be sent from Remote Device 50 to Electronic Device 100, prior to the audio data from the packet being required to be output from Buffer 100 to Output Logic 114.

Similarly, the increased delay may be used by Receiver Component 108 to recover a lost packet based on redundant information transmitted from Remote Device 50, e.g. using forward error correction techniques. Accordingly, the times at which forward error correction is used during a communication session may be determined based on detecting the loss of one or more packets when the current interactivity mode is non-interactive. For example, Receiver Component 108 may operate in response to detecting that at least one packet of audio data transmitted to Electronic Device 100 from Remote Device 50 has been lost prior to being delivered to Electronic Device 100, by checking the indication of the current interactivity mode stored in Interactivity Mode 150, and in response to Interactivity Mode 150 indicating that the current interactivity mode is non-interactive, sending a message from Electronic Device 100 to Remote Device 50 requesting that Remote Device 50 begin transmitting redundant data to the Electronic Device 100, in order to enable the Electronic Device 100 to perform error correction based on the redundant data, e.g. to recover one or more lost audio data packets using forward error correction techniques.

For example, in one example of redundant data transmission for forward error correction, in response to the request from Electronic Device 100, Remote Device 50 may begin transmitting a third redundant packet with each group of two consecutive data packets. Based on such redundant transmitted data, and assuming strictly sequential packet recipience, Receiver Component 108 can correct a missing audio data packet #2 after correctly receiving the audio data packet #1 and the redundant packet. Various other redundant data transmission patterns may be used, including patterns that may allow for correction of burst errors, e.g. errors in which more than one packet is lost. The increased delay provided by the disclosed Receiver Component 108 when packet loss is detected and the current interactivity mode is non-interactive may be necessary for using such redundant data transmission patterns to recover lost packets since the full packet sequence, including gaps, must be received prior to determining whether reconstruction of the lost packet or packets can be accomplished using the redundant data. When the packet loss cannot be concealed by reconstructing the lost packet or packets using the redundantly transmitted data, the missing audio data may instead have to be concealed in some other way, for example by substituting silence for the missing audio data from the lost packet in the buffer.

The increase in delay caused by increasing the size of Received Audio Data 112 from Initial Time Interval 116 to Increased Time Interval 117 is acceptable while Interactivity Mode 150 indicates that the current interactivity mode is non-interactive, since one or more of the communication participants are primarily or only listening, and not interacting with other participants. When the interactivity mode subsequently changes to interactive mode, e.g. during portions of the communication session when more than one participant is speaking, the amount of audio data stored in the buffer may be automatically reduced by Received Component 108, for example from Increased Time Interval 117 to Initial Time Interval 116, in order to decrease the delay in outputting Received Audio Data 112 from Electronic Device 112, thus improving the conversational quality of the communication session in order to better support the increased level of participant interaction. For example, when Buffer 110 is embodied as a PDV buffer that provides time-scaling capabilities, Receiver Component 108 may increase a play-out speed at which Received Audio Data 112 is output from Buffer 110 to a rate that is higher than the rate at which audio data is received in Audio Data Packets 60. While the play-out speed at which Received Audio Data 112 is output from Buffer 110 is higher than the rate at which audio data is received and stored in Buffer 110, the amount of received audio data stored in Buffer 110 will decrease, e.g. the size of Received Audio Data 112 in Buffer 110 will shrink. Receiver Component 108 may accordingly keep the rate at which Received Audio Data 112 is output from Buffer 110 at a rate that is higher than the rate at which audio data is received and stored in Buffer 110 until the amount of received audio data stored in Buffer 110 has decreased to Initial Time Interval 116 from Increased Time Interval 117. Using conventional, high-quality time-scaling algorithms, and assuming a typical speaking pace, the play-out of Received Audio Data 112 from Buffer 110 can typically be sped up to 130% of the rate at which audio data is received while still maintaining an acceptable level of speech intelligibility. Under such circumstances, the increased latency introduced by increasing the size of Received Audio Data 112 from Initial Time Interval 116 to Increased Time Interval 117 can potentially be reduced by 300 ms per second.

To provide even faster latency reduction, the disclosed system may be embodied to additionally or alternatively employ silence- and/or voice-activity-detection to Received Audio Data 112 in order to remove irrelevant parts (silence, noise, etc.) of the audio stream contained in the buffer, to quickly reduce the size of Received Audio Data 112 in response to detecting that the current interactivity mode has transitioned from non-interactive to interactive, thus quickly transitioning between optimal audio quality and good conversational quality. Accordingly, in one embodiment, automatically reducing the total amount of received audio data concurrently stored in the buffer contained within the audio device, in response to detecting that the interactivity mode has changed from non-interactive to interactive mode, may include a) identifying audio data representing silence stored in the buffer, and b) removing the audio data representing silence from the buffer. Alternatively, or in addition, automatically reducing the total amount of received audio data concurrently stored in the buffer contained in the audio device, in response to detecting that the interactivity mode has changed from non-interactive to interactive mode, may include a) using voice-activity-detection to identify audio data representing noise stored in the buffer, and b) removing the audio data representing noise from the buffer.

Figure 3:
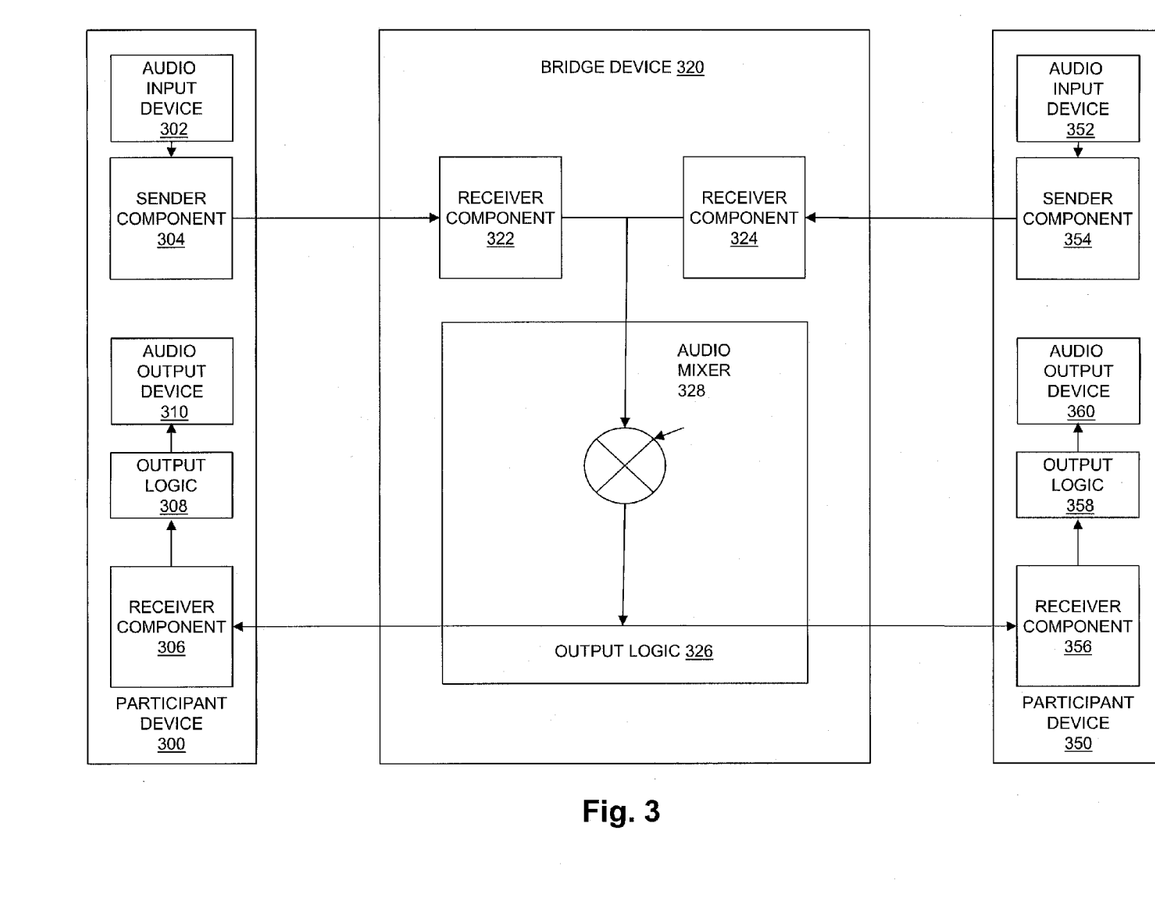
FIG. 3 is a block diagram illustrating components in which the disclosed system may be embodied in a system that provides a communication session to multiple geographically remote participants over one or more communication networks.

FIG. 3 is a block diagram illustrating components in which the disclosed system may be embodied while providing a communication session such as an online meeting to multiple geographically remote participants over one or more communication networks. As shown in FIG. 3, a Bridge Device 320 may be used to provide a communication session, such as an online meeting, to multiple participant users through their participant devices, such as Participant Device 300 and Participant Device 350, that are each communicably coupled to Bridge Device 320 by one or more communication networks. Participant Device 300 and Participant Device 350 are example embodiments of the Electronic Device 100 shown in FIG. 1 and FIG. 2, and each include a receiver component, output logic, an audio output device, an audio input device, and a sender component. Specifically, Participant Device 300 includes a Receiver Component 306, Output Logic 308, an Audio Output Device 310, an Audio Input Device 302, and a Sender Component 304. Participant Device 350 includes a Receiver Component 356, Output Logic 358, an Audio Output Device 360, an Audio Input Device 352, and a Sender Component 354. Sender Component 304, Receiver Component 306, and Output Logic 308 may each include or consist of program code stored in memory of Participant Device 300, for execution on processing circuitry (e.g. one or more microprocessors) of Participant Device 300. Sender Component 354, Receiver Component 356, and Output Logic 358 may each include or consist of program code stored in memory of Participant Device 350, for execution on processing circuitry (e.g. one or more microprocessors) of Participant Device 350.

Audio Output Device 310 and Audio Output Device 360 may consist of or include one or more speakers and related audio output circuitry. Audio Input Device 302 and Audio Input Device 352 may consist of or include one or more microphones and related audio input circuitry.

Bridge Device 320 is also an example embodiment of Electronic Device 100, albeit including two receiver components, e.g. Receiver Component 322 and Receiver Component 324, as well as an Output Logic 326. Output Logic 328 includes an Audio Mixer 328. Receiver Component 322, Receiver Component 324, and Output Logic 328 may each include or consist of program code stored in memory of Bridge Device 320, for execution on processing circuitry (e.g. one or more microprocessors) of Bridge Device 320.

During operation of the components shown in FIG. 3, when a user of Participant Device 300 speaks, the speech is part of an audio signal output from Audio Input Device 302. Sender Component 304 digitizes the audio signal received from Audio Input Device 302, e.g. by way of an audio codec contained in or accessible to Sender Component 304, and organizes the encoded digital samples into frames that are split up into RTP packets and transmitted as audio data packets to Bridge Device 320. Audio data packets sent from Participant Device 300 are received by Receiver Component 322.

When a user of Participant Device 350 speaks, the speech is part of an audio signal output from Audio Input Device 352. Sender Component 354 digitizes the audio signal received from Audio Input Device 352, e.g. by way of an audio codec contained in or accessible to Sender Component 354, and organizes the encoded digital samples into frames that are split up into RTP packets and transmitted as audio data packets to Bridge Device 320. Audio data packets sent from Participant Device 350 are received by Receiver Component 324.

Similar to the operation of Receiver Component 108 described above, each of Receiver Component 322 and Receiver Component 324 in Bridge 320 operate by storing audio data from received packets into a buffer. The received audio data stored in the buffer of Receiver Component 322, and the received audio data stored in the buffer of Receiver Component 324, is passed from the respective buffers of Receiver Component 322 and Receiver Component 324 on a first-in first-out basis to the Output Logic 326. When audio data is received by Output Logic 326 from the respective buffers of Receiver Component 322 and Receiver Component 324, Output Logic 326 mixes the received audio data, and transmits the resulting mixed audio data from the bridge device to the participant devices in packets. For example, audio data received by Output Logic 326 is passed to an Audio Mixer 328 that mixes the received audio such that audio data received from a participant device is not conveyed back to the same participant device from which it was received, in order to prevent actively speaking participants from hearing themselves. The resulting mixed audio is then organized into frames that are split up into RTP packets, and the resulting audio data packets are transmitted to Participant Device 300 and Participant Device 350.

Upon receipt of audio data packets by Participant Device 300 from Bridge Device 320, and similar to the operation of Receiver Component 108 described above, Receiver Component 306 stores audio data from the received packets into its buffer. The audio data stored in the buffer of Receiver Component 306 is output on a first-in first-out basis to the Output Logic 308. When audio data is received by Output Logic 308 from the buffer in Receiver Component 306, Output Logic 308 performs playback of the audio data by converting the audio data into an audio signal, e.g. using an audio codec or the like contained in or accessible to Output Logic 308, for output by Audio Output Device 310 as sound.

Upon receipt of audio data packets by Participant Device 350 from Bridge Device 320, and similar to the operation of Receiver Component 108 described above, Receiver Component 356 stores the audio data from the received packets into its buffer. The audio data stored in the buffer of Receiver Component 356 is output on a first-in first-out basis to the Output Logic 358. When audio data is received by Output Logic 358 from the buffer in Receiver Component 356, Output Logic 358 performs playback of the audio data by converting the audio data into an audio signal, e.g. using an audio codec or the like contained in or accessible to Output Logic 358, for output by Audio Output Device 360 as sound.

In an embodiment of Electronic Device 100 as a participant device, such as Participant Device 300 or Participant Device 350, the receiver component may detect the current interactivity mode based on a mute state of an audio input device for the participant device. For example, Receiver Component 306 may detect the current interactivity mode for Participant Device 300 by a) determining whether Audio Input Device 302 is currently muted, and b) in response to determining that Audio Input Device 302 is currently muted, detecting that the current interactivity mode for Participant Device 300 is non-interactive. Similarly, Receiver Component 356 may detect the current interactivity mode for Participant Device 350 by a) determining whether Audio Input Device 352 is currently muted, and b) in response to determining that Audio Input Device 352 is currently muted, detecting that the current interactivity mode for Participant Device 350 is non-interactive. The receiver component may then subsequently detect that the current interactivity mode has transitioned from non-interactive to interactive also based on the mute state of the audio input device for that participant device. For example, Receiver Component 306 may detect that the current interactivity mode for Participant Device 300 has transitioned from non-interactive to interactive by detecting that Audio Input Device 302 has transitioned from muted to un-muted. Similarly, Receiver Component 356 may detect that the current interactivity mode for Participant Device 350 has transitioned from non-interactive to interactive by detecting that Audio Input Device 352 has transitioned from muted to un-muted.

Also in an embodiment of Electronic Device 100 as a participant device, such as Participant Device 300 or Participant Device 350, the receiver component may detect the current interactivity mode by monitoring the audio input device for that participant device for the presence of speech during the communication session, e.g. using conventional voice activity detection techniques. For example, Receiver Component 306 may detect the current interactivity mode for Participant Device 300 by a) determining whether speech has been input through Audio Input Device 302 since the beginning of the communication session, and b) in response to determining that no speech has been input through Audio Input Device 302 since the beginning of the communication session, detecting that the current interactivity mode for Participant Device 300 is non-interactive. Similarly, Receiver Component 356 may detect the current interactivity mode for Participant Device 350 by a) determining whether speech has been input through Audio Input Device 352 since the beginning of the communication session, and b) in response to determining that no speech has been input through Audio Input Device 352 since the beginning of the communication session, detecting that the current interactivity mode for Participant Device 350 is non-interactive. The receiver component may then subsequently detect that the current interactivity mode has transitioned from non-interactive to interactive based on detecting speech in an audio signal received from the audio input device for that participant device. For example, Receiver Component 306 may detect that the current interactivity mode for Participant Device 300 has transitioned from non-interactive to interactive by detecting speech in an audio signal received from Audio Input Device 302. Similarly, Receiver Component 356 may detect that the current interactivity mode for Participant Device 350 has transitioned from non-interactive to interactive by detecting speech in an audio signal received from Audio Input Device 352.

In another example in which Electronic Device 100 is embodied as a participant device, such as Participant Device 300 or Participant Device 350, the receiver component may detect the current interactivity mode by monitoring the audio input device for that participant device for the presence of any audio signal during the communication session. For example, Receiver Component 306 may detect the current interactivity mode for Participant Device 300 by a) determining whether any audio signal has been output by Audio Input Device 302 since the beginning of the communication session, and b) in response to determining that no audio signal has been output from Audio Input Device 302 since the beginning of the communication session, detecting that the current interactivity mode for Participant Device 300 is non-interactive. Similarly, Receiver Component 356 may detect the current interactivity mode for Participant Device 350 by a) determining whether any audio signal has been output from Audio Input Device 352 since the beginning of the communication session, and b) in response to determining that no audio signal has been output from Audio Input Device 352 since the beginning of the communication session, detecting that the current interactivity mode for Participant Device 350 is non-interactive. The receiver component may then subsequently detect that the current interactivity mode has transitioned from non-interactive to interactive based on detecting that an audio signal has been output by the audio input device for that participant device. For example, Receiver Component 306 may detect that the current interactivity mode for Participant Device 300 has transitioned from non-interactive to interactive by detecting an audio signal output from Audio Input Device 302. Similarly, Receiver Component 356 may detect that the current interactivity mode for Participant Device 350 has transitioned from non-interactive to interactive by detecting an audio signal output from Audio Input Device 352.

The current interactivity mode of Receiver Component 322 and/or Receiver Component 324 may, for example, be detected based on the general level of interactivity within the communication session, so that the current interactivity mode of Receiver Component 322 and/or Receiver Component 324 is detected as non-interactive when only one participant is speaking and the remainder of the participants are only listening. For example, a Receiver Component 322 and/or Receiver Component 324 may detect a current interactivity mode of non-interactive in response to a) detecting that all participant devices except one have their audio input devices muted, b) detecting that speech has been detected in the audio signal output from an audio input device of only one of the participant devices since the start of the communication session, and/or c) detecting that an audio signal has been output from the audio input device of only one of the participant devices since the start of the communication session. Receiver Component 322 and/or Receiver Component 324 may subsequently detect that the current interactivity mode has transitioned from non-interactive to interactive when the level of interactivity within the communication session increases, e.g. when more than one participant is speaking. For example, a Receiver Component 322 and/or Receiver Component 324 may detect that the current interactivity mode has transitioned from non-interactive to interactive in response to a) detecting that a previously muted audio input device has become un-muted, b) detecting that speech has been detected in the audio signal output from an audio input device of one of the participant devices from which no speech had previously been detected since the start of the communication session, c) detecting that an audio signal has been output from the audio input device of one of the participant devices from which no audio signal had previously been output since the start of the communication session.

Figure 4:
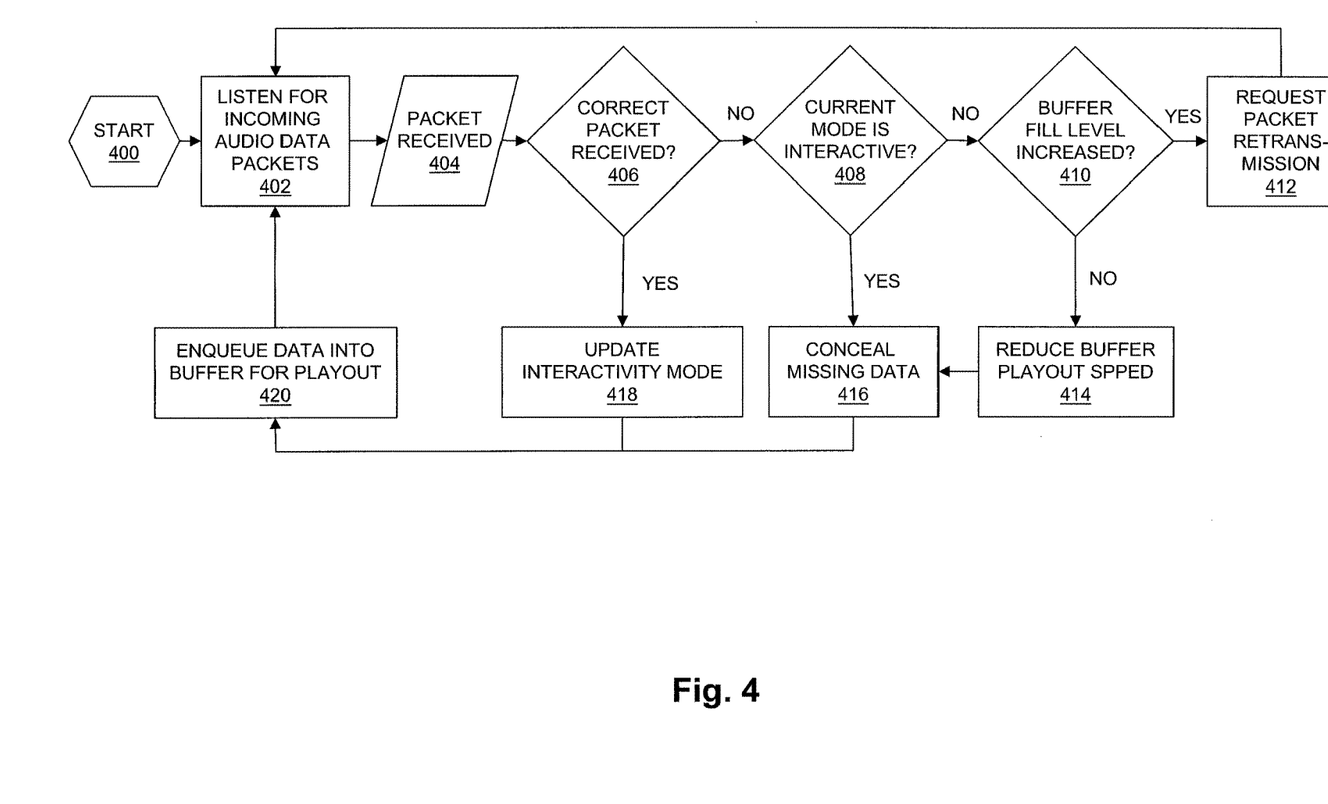
FIG. 4 is a flow chart showing an example of steps that may be performed by an illustrative embodiment of the disclosed receiver component.

FIG. 4 is a flow chart showing an example of steps that may be performed during operation of an embodiment of the disclosed receiver component. At 400, a communication session, such as an online meeting or the like, is started. At 402, the receiver component listens for incoming audio packets. At step 404, an audio packet is received. At step 406, a determination is made as to whether a packet has been lost, by determining whether the received packet is the correct packet to be received in the current context. For example, the determination at 406 may be made by comparing a sequence number contained in the received packet to a next expected sequence number, i.e. to the sequence number following the sequence number contained in the last correctly received packet. If there is a match, then the received packet is the correct packet, and step 406 is followed by step 418. Otherwise, a packet has been lost, and step 406 is followed by step 408.

At step 418, the receiver component updates the current interactivity mode, and at step 420, the audio data from the received audio data packet is enqueued into the buffer of the receiver component for subsequent playout from the buffer to output logic of the electronic device.

At step 408, in the case where the receiver component has detected that a packet has been lost, the receiver component checks the current interactivity mode. If the current interactivity mode is non-interactive, step 408 is followed by step 410. Otherwise, if the current interactivity mode is interactive, then step 408 is followed by step 416.

At step 410, the receiver component checks the current fill level of the buffer used to store received audio data. If the time interval of received audio data stored in the buffer is sufficient to allow for packet retransmission (e.g. is equal to Increased Time Interval 117 shown in FIG. 2), then step 410 is followed by step 412, in which a request for retransmission of the lost packet is sent to the device that transmitted the lost packet (e.g. from Electronic Device 100 to Remote Device 50). Step 412 is followed by step 402, in which the receiver component resumes listening for incoming audio data packets.

Otherwise, if the time interval of received audio data stored in the buffer is not sufficient to allow for packet retransmission (e.g. is less than Increased Time Interval 117), then step 410 is followed by step 414, in which the receiver component reduces the rate at which audio data is played out from the buffer to a rate that is less than the rate at which audio data is received and stored into the buffer. As a result, as subsequent audio data is received and stored, the time interval of received audio data stored in the buffer begins to increase. Step 414 is followed by step 416, in which the missing audio data from the lost packet is concealed, e.g. by, if possible, re-creating the audio data from the lost packet using error correction techniques, or by replacing the audio data from the lost packet with silence, or by using some other technique for concealing the missing audio data. Step 416 is followed by step 420, in which the audio data created at step 416 to conceal the missing audio data from the lost packet is enqueued into the buffer of the receiver component for subsequent playout from the buffer to output logic of the electronic device. Step 420 is followed by step 402, in which the receiver component resumes listening for incoming audio data packets.

After the rate at which audio data is played out from the buffer has been reduced at step 414, the audio data added to the buffer from subsequently received audio packets causes the amount of received audio data in the buffer to increase, until eventually the determination at step 410 is that the fill level of the buffer indicates that the amount of received audio data stored in the buffer has been increased to a time interval greater than the round trip time between the electronic device and the remote device, and is accordingly sufficient to allow for packet retransmission. At that point, the receiver component can reset the rate at which audio data is played out from the buffer to a rate equal to the rate at which audio data is received and stored into the buffer, and the receiver component can request retransmission of lost packets in order to provide a high level of audio quality. While the receiver component waits for the retransmitted packet to be received, the buffer is outputting audio data, and accordingly the buffer is being emptied. However, because the time interval of audio data stored in the buffer has a duration greater than the duration of the round trip delay between the electronic device and the remote device, the retransmitted lost packet will arrive before its payload is required to continue outputting audio data from the buffer. As a result, the output stream of the buffer does not reflect the fact that a packet was lost on the input stream.

Those skilled in the art will recognize that various modifications may be made to the disclosed technology. For example, while the above description includes reference to using a combination of participant devices and a bridge device in a client/server infrastructure, the disclosed techniques are not limited to such an approach. Accordingly, the disclosed techniques for interactivity-driven error correction may be used in a peer-to-peer configuration. In such an approach, the mixing component of the bridge device may be moved to the receiver component, and the mixing of multiple audio sources is performed by the receiver component. As with the above described client/server infrastructure embodiments, non-interactive participants may similarly benefit from improved error correction, since they don't have strict latency requirements for effective communications with other participants.

In addition, while the above description is with regard to voice communications, other types of real-time communication systems that operate over packet-switched networks using unreliable transport protocols, and that involves interactive and non-interactive participants, may potentially benefit from the interactivity-driven error correction approach disclosed herein. For example, in cloud based audio, video and screen sharing recording systems for online meetings, the recorder entity can be considered a participant in a session, receiving the same media content using the same technologies as all other participants. Accordingly, the recording quality (be it audio, video or screen sharing) may be subject to the effects of packet loss as well. The disclosed system would detect a non-interactive mode with regard to the receiver component for the recorder participant, and would use increased latency in order to seamlessly provide packet retransmission and/or forward error correction to minimize quality degradation for the recording.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied at least in part in one or more non-transitory computer readable storage medium(s) having computer readable program code stored thereon for causing one or more processors and/or a computer system to carry out those aspects of the present disclosure.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

While the invention is described through the above exemplary embodiments, it will be understood by those of ordinary skill in the art that modification to and variation of the illustrated embodiments may be made without departing from the inventive concepts herein disclosed.

What is claimed is:

1. A method of handling packet loss during a communication session, the method comprising:
   storing audio data received by an electronic device from a remote device during the communication session into a buffer contained within the electronic device, before the received audio data is provided from the buffer, on a first-in first out basis, to output logic of the electronic device;
   during the communication session, detecting a current interactivity mode, wherein the current interactivity mode is selected from the group consisting of a) non-interactive, indicating a low level of interactivity between participants in the communication session, and b) interactive, indicating a high level of interactivity between participants in the communication session;
   storing an indication of the detected current interactivity mode;
   detecting, during the communication session, that at least one packet of audio data transmitted to the electronic device from a remote device has been lost prior to being delivered to the electronic device; and
   in response to detecting that at least one packet of audio data transmitted to the electronic device from the remote device has been lost prior to being delivered to the electronic device, a) checking the stored indication of the current interactivity mode, and b) in response to the stored indication of the current interactivity mode indicating that the current interactivity mode is non-interactive, automatically increasing a total amount of received audio data concurrently stored in the buffer contained within the electronic device.

2. The method of claim 1, further comprising, also in response to both a) detecting that at least one packet of audio data transmitted to the electronic device from the remote device has been lost prior to being delivered to the electronic device, and b) detecting that the current interactivity mode is non-interactive, indicating to the remote device that the remote device is to begin transmitting redundant data to the electronic device in order to enable error correction by the electronic device.

3. The method of claim 1, further comprising:
   detecting that the current interactivity mode has changed from non-interactive to interactive; and
   in response to detecting that the current interactivity mode has changed from non-interactive to interactive, automatically reducing the total amount of received audio data concurrently stored in the buffer contained within the audio device.

4. The method of claim 3, wherein automatically reducing the total amount of received audio data concurrently stored in the buffer contained within the audio device includes a) identifying audio data representing silence stored in the buffer, and b) removing the audio data representing silence from the buffer.

5. The method of claim 3, wherein automatically reducing the total amount of received audio data concurrently stored in the buffer contained in the audio device includes a) identifying audio data representing noise stored in the buffer, and b) removing the audio data representing noise from the buffer.

6. The method of claim 3, wherein the electronic device comprises a participant device; and
   wherein detecting that the current interactivity mode has changed from non-interactive to interactive includes detecting that an audio input of the electronic device has transitioned from muted to un-muted.

7. The method of claim 3, wherein the electronic device comprises a participant device, and
   wherein detecting that the current interactivity mode has changed from non-interactive to interactive includes detecting speech received by an audio input device of the electronic device.

8. The method of claim 3, wherein the electronic device comprises a participant device, and
   wherein detecting that the current interactivity mode has changed from non-interactive to interactive includes detecting an audio signal output from an audio input device of the electronic device.

9. A method of handling packet loss during a communication session, the method comprising:
   storing audio data received by an electronic device from a remote device during the communication session into a buffer contained within the electronic device, before the received audio data is provided from the buffer, on a first-in first out basis, to output logic of the electronic device;
   during the communication session, detecting a current interactivity mode, wherein the current interactivity mode is selected from the group consisting of a) non-interactive, indicating a low level of interactivity between participants in the communication session, and b) interactive, indicating a high level of interactivity between participants in the communication session;
   storing an indication of the detected current interactivity mode;

detecting, during the communication session, that at least one packet of audio data transmitted to the electronic device from a remote device has been lost prior to being delivered to the electronic device;

in response to detecting that at least one packet of audio data transmitted to the electronic device from the remote device has been lost prior to being delivered to the electronic device, a) checking the stored indication of the current interactivity mode, and b) in response to the stored indication of the current interactivity mode indicating that the current interactivity mode is non-interactive, automatically increasing a total amount of received audio data concurrently stored in the buffer contained within the electronic device;

determining a round trip time between the electronic device and the remote device; and wherein automatically increasing the total amount of received audio data concurrently stored in the buffer within the electronic device comprises increasing the total amount of received audio data concurrently stored in the buffer within the electronic device to equal an amount of audio data spanning a time interval having a duration that is greater than the round trip time between the electronic device and the remote device.

10. The method of claim 9, wherein automatically increasing the total amount of received audio data concurrently stored in the buffer within the electronic device comprises time stretching audio data stored in the buffer by decreasing a play-out speed at which audio data is output from the buffer to the output logic to a rate that is slower than an input rate at which audio data is received and added to the buffer, until the total amount of received audio data concurrently stored in the buffer within the electronic device spans the time interval having a duration that is greater than the round trip time between the electronic device and the remote device.

11. The method of claim 10, wherein the electronic device comprises a participant device; and wherein detecting the current interactivity mode includes a) determining whether an audio input device of the electronic device is currently muted, and b) in response to determining that the audio input device of the electronic device is currently muted, detecting that the current interactivity mode is non-interactive.

12. The method of claim 10, wherein the electronic device comprises a participant device; and wherein detecting the current interactivity mode includes a) monitoring, during the communication session, an audio input device of the electronic device for the presence of speech received by the audio input device, and b) in response to detecting that no speech has been received by the audio input device of the electronic device during the communication session, detecting that the current interactivity mode is non-interactive.

13. The method of claim 10, wherein the electronic device comprises a participant device; and wherein detecting the current interactivity mode includes a) monitoring, during the communication session, an audio input device of the electronic device for the presence of an audio signal output from the audio input device, and b) in response to detecting that no audio signal has been output from the audio input device of the electronic device during the communication session, detecting that the current interactivity mode is non-interactive.

14. The method of claim 10, wherein the electronic device comprises a participant device, and wherein the buffer stores audio data received by the electronic device during the communication session prior to providing the received audio data from the buffer on a first-in first-out basis to the output logic in the electronic device for playback of the received audio data by the output logic through at least one speaker of the participant device.

15. The method of claim 10, wherein the electronic device comprises a bridge device, and wherein the buffer stores audio data received by the electronic device during the communication session prior to providing the received audio data from the buffer on a first-in first-out basis to the output logic in the electronic device for transmission of the audio data output from the buffer in packets from the bridge device to at least one participant device.

16. An electronic device, comprising:

processing circuitry; and memory communicably coupled to the processing circuitry, the memory storing program code for handling packet loss during a communication session, wherein the program code, when executed by the processing circuitry, causes the processing circuitry to:

store audio data received by an electronic device from a remote device during the communication session into a buffer contained within the electronic device, before the received audio data is provided from the buffer, on a first-in first out basis, to output logic of the electronic device;

during the communication session, detect a current interactivity mode, wherein the current interactivity mode is selected from the group consisting of a) non-interactive, indicating a low level of interactivity between participants in the communication session, and b) interactive, indicating a high level of interactivity between participants in the communication session;

store an indication of the detected current interactivity mode;

detect, during the communication session, that at least one packet of audio data transmitted to the electronic device from a remote device has been lost prior to being delivered to the electronic device; and in response to detecting that at least one packet of audio data transmitted to the electronic device from the remote device has been lost prior to being delivered to the electronic device, a) check the stored indication of the current interactivity mode, and b) in response to the stored indication of the current interactivity mode indicating that the current interactivity mode is non-interactive, automatically increase a total amount of received audio data concurrently stored in the buffer contained within the electronic device.

17. The electronic device of claim 16, wherein the program code, when executed by the processing circuitry, further causes the processing circuitry to automatically increase the total amount of received audio data concurrently stored in the buffer within the electronic device by time stretching audio data stored in the buffer by decreasing a play-out speed at which audio data is output from the buffer to the output logic to a rate that is slower than an input rate at which audio data is received and added to the buffer, until the total amount of received audio data concurrently stored in the buffer within the electronic device spans the time interval having a duration that is greater than the round trip time between the electronic device and the remote device.

18. The electronic device of claim 16, wherein the program code, when executed by the processing circuitry, further causes the processing circuitry to, also in response to both a) detecting that at least one packet of audio data transmitted to the electronic device from the remote device has been lost prior to being delivered to the electronic device, and b) detecting that the current interactivity mode is non-interactive, indicate to the remote device that the remote device is to begin transmitting redundant data to the electronic device in order to enable error correction by the electronic device.

19. The electronic device of claim 16, wherein the program code, when executed by the processing circuitry, further causes the processing circuitry to:
  detect that the current interactivity mode has changed from non-interactive to interactive; and
  in response to detecting that the current interactivity mode has changed from non-interactive to interactive, automatically reduce the total amount of received audio data concurrently stored in the buffer contained within the audio device.

20. An electronic device, comprising:
  processing circuitry; and
  memory communicably coupled to the processing circuitry, the memory storing program code for handling packet loss during a communication session, wherein the program code, when executed by the processing circuitry, causes the processing circuitry to:
    store audio data received by an electronic device from a remote device during the communication session into a buffer contained within the electronic device, before the received audio data is provided from the buffer, on a first-in first out basis, to output logic of the electronic device;
    during the communication session, detect a current interactivity mode, wherein the current interactivity mode is selected from the group consisting of a) non-interactive, indicating a low level of interactivity between participants in the communication session, and b) interactive, indicating a high level of interactivity between participants in the communication session;
    store an indication of the detected current interactivity mode;
    detect, during the communication session, that at least one packet of audio data transmitted to the electronic device from a remote device has been lost prior to being delivered to the electronic device;
    determine a round trip time between the electronic device and the remote device; and
    in response to detecting that at least one packet of audio data transmitted to the electronic device from the remote device has been lost prior to being delivered to the electronic device, a) check the stored indication of the current interactivity mode, and b) in response to the stored indication of the current interactivity mode indicating that the current interactivity mode is non-interactive, automatically increase the total amount of received audio data concurrently stored in the buffer within the electronic device by increasing the total amount of received audio data concurrently stored in the buffer within the electronic device to equal an amount of audio data spanning a time interval having a duration that is greater than the round trip time between the electronic device and the remote device.

21. A computer program product including a non-transitory computer readable medium which stores program code that, when executed by processing circuitry, is operable to handle packet loss during a communication session, the program code comprising:
  program code for storing audio data received by an electronic device from a remote device during the communication session into a buffer contained within the electronic device, before the received audio data is provided from the buffer, on a first-in first out basis, to output logic of the electronic device;
  program code for, during the communication session, detecting a current interactivity mode, wherein the current interactivity mode is selected from the group consisting of a) non-interactive, indicating a low level of interactivity between participants in the communication session, and b) interactive, indicating a high level of interactivity between participants in the communication session;
  program code for storing an indication of the detected current interactivity mode;
  program code for detecting, during the communication session, that at least one packet of audio data transmitted to the electronic device from a remote device has been lost prior to being delivered to the electronic device; and
  program code for, in response to detecting that at least one packet of audio data transmitted to the electronic device from the remote device has been lost prior to being delivered to the electronic device, a) checking the stored indication of the current interactivity mode, and b) in response to the stored indication of the current interactivity mode indicating that the current interactivity mode is non-interactive, automatically increasing a total amount of received audio data concurrently stored in the buffer contained within the electronic device.

* * * * *